United States Patent
Kyle et al.

[15] 3,695,768
[45] Oct. 3, 1972

[54] METHOD AND APPARATUS FOR DETERMINING MAGNIFICATION RATIO OF MICROFORM READER

[72] Inventors: Thomas A. Kyle, 2317 Barnett Drive, Bellbrook, Ohio 45305; Charles T. Croy, 5585 Winshire Terrace, Dayton, Ohio 45440

[22] Filed: June 11, 1971

[21] Appl. No.: 152,203

[52] U.S. Cl. ................................................356/165
[51] Int. Cl. ................................................G01b 9/08
[58] Field of Search........356/156, 164, 165, 166, 169

[56] References Cited

UNITED STATES PATENTS

| 2,592,264 | 4/1952 | Fultz | 356/164 |
|---|---|---|---|
| 2,769,370 | 11/1956 | Tompkins | 356/156 |
| 3,539,264 | 11/1970 | Moore et al. | 256/165 |

*Primary Examiner*—William L. Sikes
*Attorney*—Louis A. Kline et al.

[57] ABSTRACT

A microform reader chart having a plurality of microimages thereon is used to determine the magnification ratio of a reader and for displaying various size character samples. The character font and spacing is duplicated in a plurality of frames of data, each frame being recorded at a different reduction ratio. The placing of the chart in a reader enables the user to determine in precise manner the magnification of the reader and to observe display of different print sizes and spacing thereof.

9 Claims, 5 Drawing Figures

INVENTORS
THOMAS A. KYLE
CHARLES T. CROY

BY *Louis A Kline*
*Wilbert Hawk, Jr.*
*Geo. J Merckenthaler*

THEIR ATTORNEYS

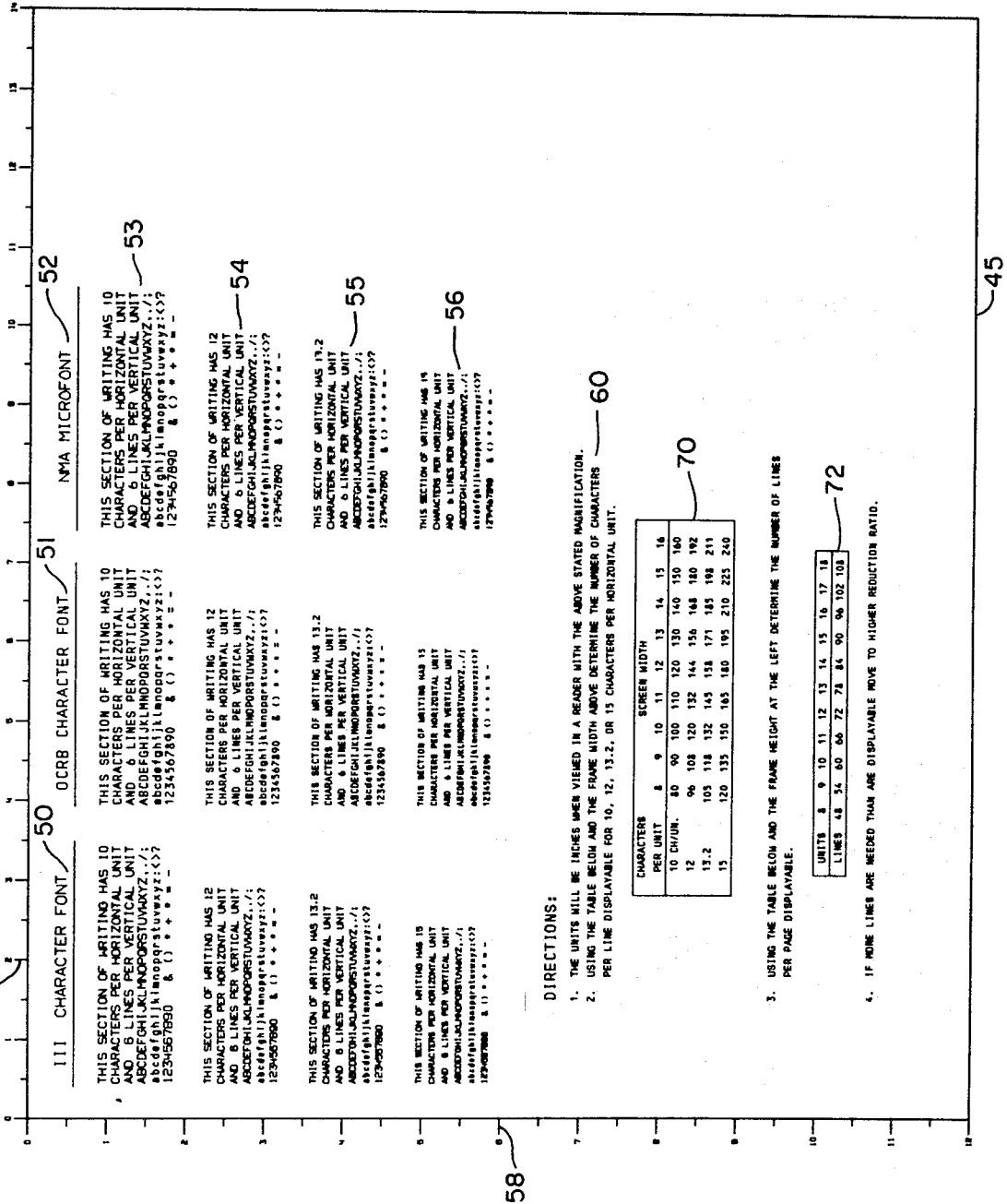

METHOD AND APPARATUS FOR DETERMINING MAGNIFICATION RATIO OF MICROFORM READER

BACKGROUND OF THE INVENTION

In the field of microform readers, there are numerous arrangements and systems which utilize a source of light, a projection lens, and a screen for displaying an enlargement of a microform image placed between the source of light and the lens. The projection lenses utilized in these readers may have various magnification ratios and the microforms placed in any one of such readers also may have images thereon which vary in size and reduction ratio. It is generally desired that the reduction ratio of the microform and the magnification ratio of the lens be compatible to provide a picture on the screen wherein the desired image from the microform is projected thereon in a manner which is easily read and which covers substantially the entire screen area. Since the magnification ratios of the projection lenses used in different readers may vary greatly, for example, from 17:1 or less to 50:1 or more, and since the reduction ratios of the images on the microforms may be of various denominations, it becomes extremely desirable to have specific knowledge of the lens magnification ratio for the reader being used and also the reduction ratio of the image on the microform to read thereby.

Although the industry has accepted certain standards in the printing field, such as the spacing of ten (10) characters per inch horizontally and six (6) lines per inch vertically, it may be desirable to increase the number of characters per inch or the number of lines per inch to display more information on a certain size screen. In this respect, the display on the reader screen which best shows the projected image may be different from accepted standards for a particular reader. It then becomes necessary to provide means for simply and rapidly acquiring specific knowledge in regard to a certain reader and to a desired display viewable on the screen. Methods commonly used have included lengthy calculation and/or trial-and-error procedures which, of course, leave much to be desired.

SUMMARY OF THE INVENTION

The present invention relates to microform readers and more particularly to means for determining the magnification ratio of a reader and for displaying various font and size character samples. The invention makes available a microform reader chart in the nature of a single microfiche which is inserted into a reader in the same manner as any microform suitable for this type reader and information on the chart is then viewed on the reader screen. Such chart or microfiche includes a plurality of reduced images thereon containing (in framed fashion) information regarding printed instructions, a series of linear reduction scales, and a plurality of record data frames at different reduction ratios, in the present instance these ratios being in the (i.e. reduced of 17X to 50X i.e., reduced 17 to 50 times original size).

There are at least two situations which may arise wherein it is desirable to utilize an important feature of the present invention, one situation being to determine the magnification ratio of a reader of unknown ratio and the other to verify the ratio of a reader of supposedly known ratio. When it is desired to determine the magnification factor or ratio of a reader of unknown ratio, the microfiche of the present invention is inserted therein and moved to a selected one of the two linear scale frames to reflect such frame onto the screen, a ruler is then placed against the screen and moved vertically thereon to a position wherein unit marks on the ruler coincide with those of a particular line of the linear scale series of lines on the microfiche as enlarged on the screen, and the magnification factor is thereafter read at the one end of the matched line. The same procedure is utilized to verify the ratio of a specific reader, although it is simpler and faster to do because the ratio is supposedly known to lie within a certain range, which permits the ruler to be initially placed on the line of the linear scale corresponding to such "known" ratio.

When it is desired to display various character sizes and fonts on the screen, the microfiche of the present invention is inserted in the reader and moved to the frame of record data corresponding to the magnification factor that was read in the above-mentioned determination. Unit marks across the top and down the one side of each such record data frame are provided in spaced relationship to represent a "standard inch" ruled scale so that the usable height and width can thus be read directly from the screen. If it is desired to increase or decrease the number of characters per inch horizontally or the number of lines per inch vertically, the microfiche is simply moved to a higher or lower such magnification ratio frame, accordingly. Since all the frames contain substantially the same information, that frame is selected which provides the best printing format to fill the reader screen.

In accordance with the above discussion, the principal object of the present invention is to provide a method and apparatus for determining the magnification ratio of a microform reader of unknown ratio.

Another object of the present invention is to provide a method and apparatus for verifying the magnification ratio of a microform reader of known nominal ratio.

A further object of the present invention is to provide a method and apparatus for determining the dimensions of the aperture of a given reader for displaying the total image viewable.

An additional object of the present invention is to provide means for displaying character patterns of different reduction ratios for selection of the optimum display on the screen.

And a further object of the present invention is to provide means for displaying standard character fonts of different reduction ratios for selection of the optimum display.

Additional advantages and features of the present invention will become apparent and fully understood from the following description taken together with the annexed drawings in which:

FIG. 5 is an enlarged plan view of a representative one (being 24X) of the magnification ratio frames shown in FIG. 2.

Figure 1:
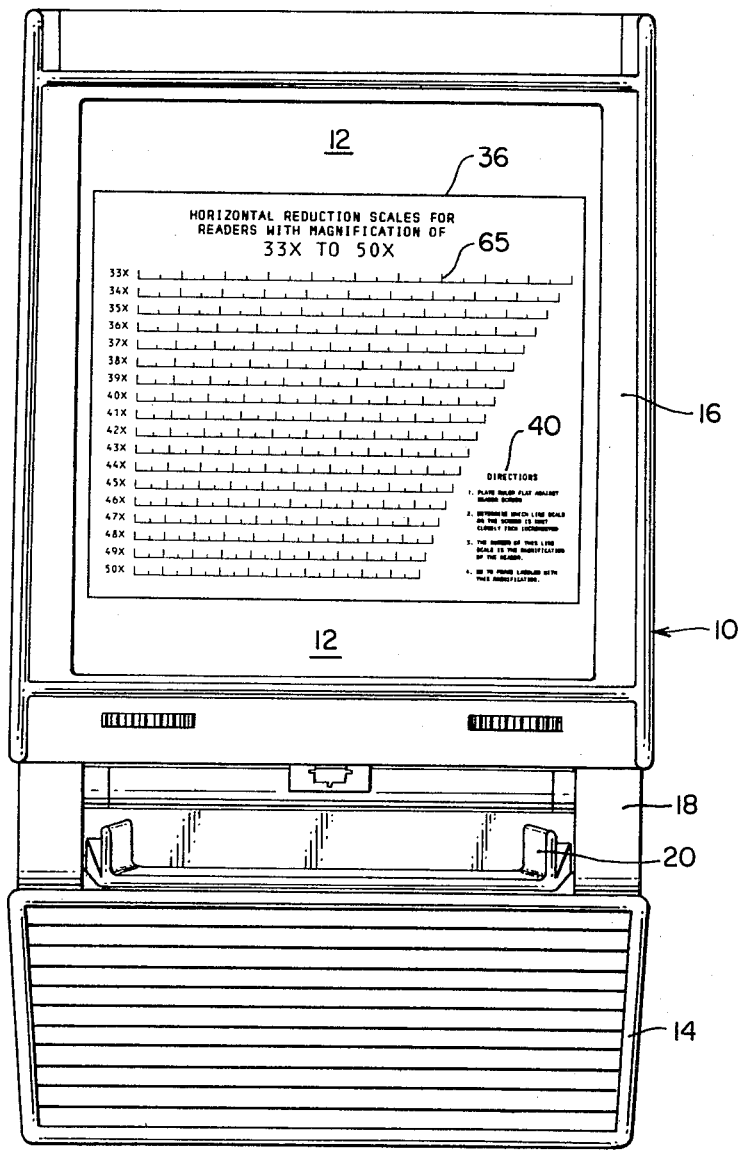
FIG. 1 is a front elevational view of a microform reader of the type used in the present invention and displaying one of the microfiche contained linear reduction scale frames on the screen thereof.

Referring to FIG. 1, a microform reader or viewer of the portable type, generally designated as 10, includes a housing of generally rectangular box shape to contain the working parts of the reader. Specific details of the appearance of this reader are contained in United States application, Ser. No. D25,892, filed Nov. 9, 1970 in the names of J. C. Kaufman and R. L. Funkhouser, and assigned to the same assignee as the present application. Additionally, certain details of construction of this reader are contained in United States application, Ser. No. 127,145, filed Mar. 23, 1971, in the names of T. A. Kyle and W. L. Schutrum, and assigned to the same assignee.

As is well known, a microform reader basically has a microform image holder or carrier, a projection lens and optical system, and a screen for viewing the enlargement of the microimage. The details of the projection lens and optical system are not shown, as they form no part of the present invention; however, suffice it to say that the optical system includes a source of light, the projection lens, and the required mirrors to direct the projected image from the microform (in the nature of a film or transparency) along a path onto the screen 12. As is also well known, the microforms viewed with a reader of this type are in the form of cards, sheets, or the like containing information from a plurality of pages of information in the form of reduced images so that a single card or sheet may contain 75 to 100 or more of such reduced images, depending upon the size of the card or sheet and the reduction ratio of the images thereon.

Provision is made in the reader 10 to load and unload the microform selected to be read, and this generally is in the nature of a carrier which is drawn forwardly, or toward the operator, to insert the form, and then is pushed rearwardly to position the form for projection of an image thereof onto the screen for reading, after which the carrier may be again pulled forwardly for removal of the microform therefrom. For illustrating the instant invention, the reader comprises a lower portion 14 and an upper portion 16, separated by an intermediate portion 18 which carries the microform holder or carrier assembly. This assembly is movable as a unit in a fore-and-aft and a side-to-side direction for the purpose of positioning for viewing on the screen a selected image of the microform, all as disclosed in the above-mentioned T. A. Kyle et al. application. The microform holder or carrier comprises suitable glass plates (not shown) between which is placed the microform and the holder is movable in the above-mentioned directions by means of a handle 20.

Figure 2:
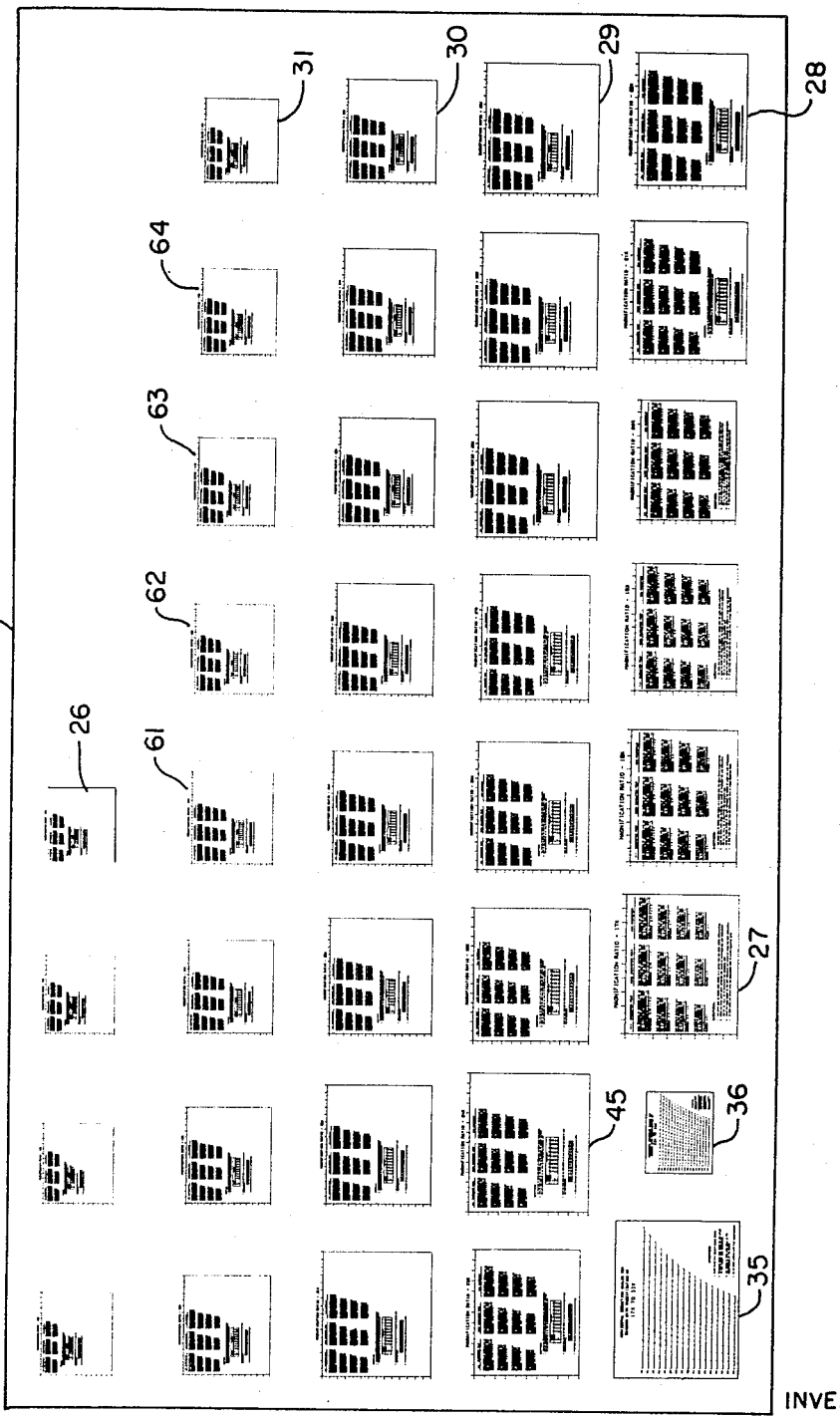
FIG. 2 is an enlarged plan view of a microfiche incorporating the various frames in image form of the reduction ratios used in the present invention.

The microform used in the present invention and which carries the microimages thereon is a microfiche of nominal 4 by 6 inch dimensions and is of the transparency type wherein the majority of the surface area is opaque and the image is substantially transparent to allow the passage of light therethrough. In this respect, the microfiche is structured in the nature of a template to permit projection of the images thereon to the screen 12. In FIG. 2 is shown an enlarged representation 25 of the microfiche chart showing a plurality of images thereon, the smallest image 26 near the center top being at a 50 X reduction ratio and the largest image 27 at the lower left being at a 17 X reduction ratio. Although microform readers or viewers commonly use lens systems in the 24 to 28 and 38 to 42 times magnification ratio, it would be merely an extension of the present microfiche chart to include ratios of 150 times or more. The images or image frames on the microfiche 25 decrease in size as the magnification ratio increases as seen by selected images at the right side of the fiche, the 22 X ratio at 28, the 30 X ratio at 29, the 38 X ratio at 30, the 46 X ratio at 31, and, of course, the 50 X ratio 26 at the center top of the fiche. Although not every image frame is reference numbered, the magnification ratio number increases in a reading of the frames from left to right, e.g. the 17 X ratio 27 to the 22 X ratio 28, across the lower line of frames of the fiche 25.

Figure 3:
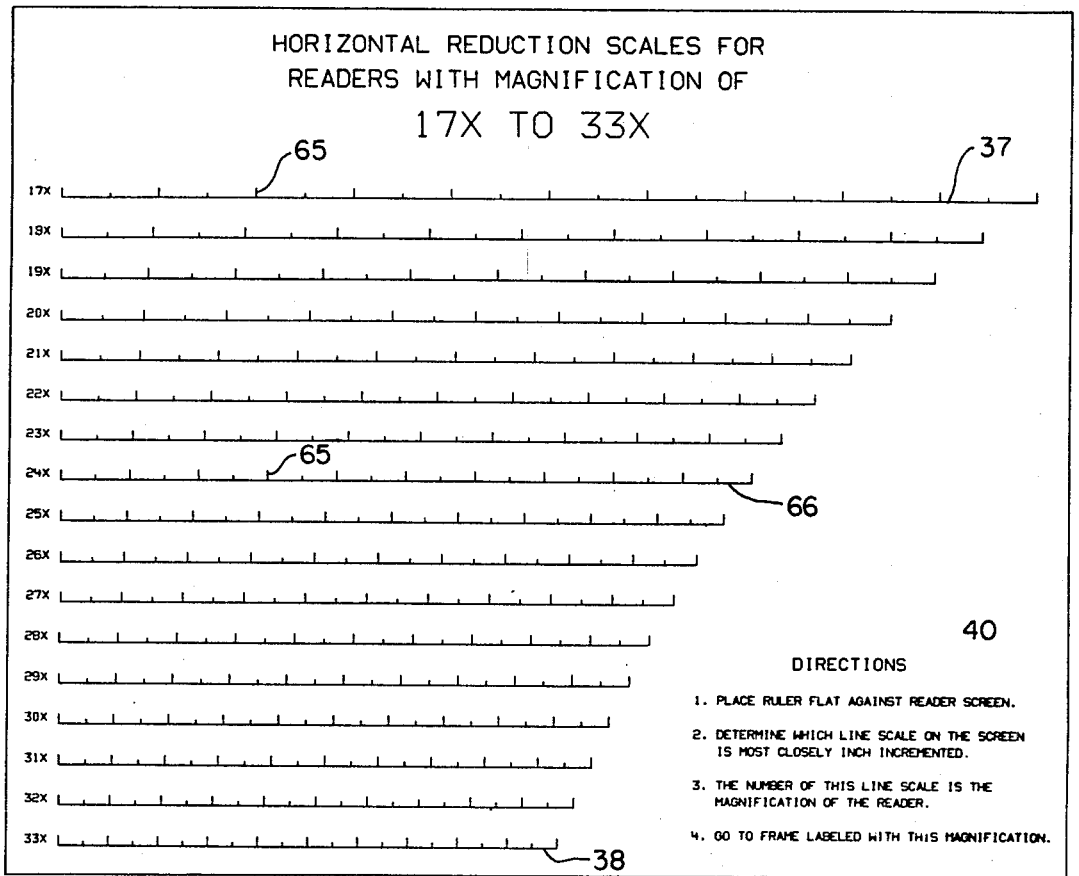
FIG. 3 is an enlarged plan view of one of the horizontal reduction scales shown in FIG. 2.
Figure 4:
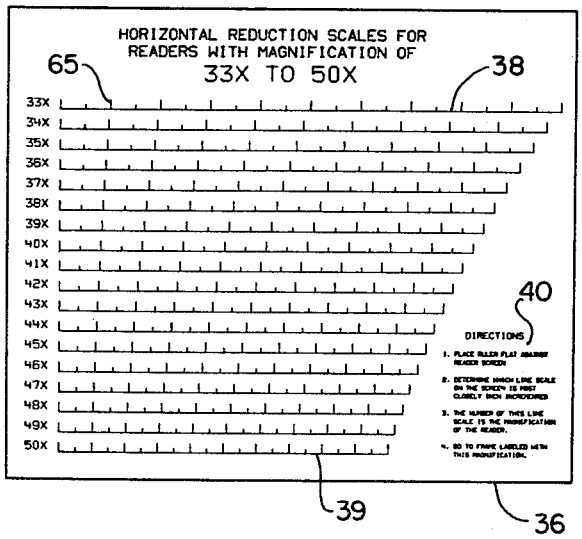
FIG. 4 is a similar view of the other of the horizontal reduction scales shown in FIG. 2.

At the lower left of the fiche chart 25 (FIG. 2) are horizontal reduction scales 35 and 36, scale 35 being used for readers with magnification ratios of 17 X to 33 X and scale 36 being used for readers with magnification ratios of 33 X to 50 X. The reduction scale 35 consists of scaled lines shown as 37 (FIG. 3) for the 17 X ratio line and decreasing in length but increasing in magnification ratio to the 33 X ratio line, as shown at 38. Likewise, the reduction scale 36 (FIG. 4) consists of scaled lines including the 33 X ratio line 38 and decreasing in length but increasing in magnification ratio to the 50 X ratio line, as shown at 39. Each line of the several scales 35 and 36 is divided into units decreasing in length from the 17 X to the 50 X scale. It is to be noted, of course, that the unit marks across the 17 X ratio line are not inch incremented because of the necessity for reducing the actual displayed image for purpose of the drawing. Directions 40 are also included with each scale 35, 36 for proper use thereof in carrying out the invention.

In FIG. 5 is shown an enlargement of the image frame 45, FIG. 2, which frame has a reader magnification ratio of 24 X and which depicts typical reading matter repeated on the various other image frames. As mentioned above, the common and accepted standards are the spacing of ten (10) characters per inch horizontally and six (6) lines per inch vertically, however it is sometimes desirable to increase the number of characters to twelve (12) and/or the lines per inch to seven (7) for the purpose of obtaining increased efficiency in the use of a specific reader. As is characteristic of all the image frames on the microfiche chart 25, frame 45 contains three different character fonts of printing, these being the Information International Incorporated Font 50, the Optical Character Recognition B Font 51, and the National Microfilm Association Microfont 52. The upper paragraph 53 of each of such fonts has ten (10) characters per inch, the second paragraph 54 in each instance has twelve (12) per inch, the third paragraph 55 has thirteen and two tenths (13.2) per inch, and the lower paragraph 56 has fifteen (15) characters per inch, with each of the paragraphs having six (6) lines per inch vertically. Horizontal unit marks 57 and vertical unit marks 58 are spaced at the top and side of the frame, respectively. Again, these unit marks are not shown as inch incremented because of the reduced scale of the figure for the drawing. Additionally, it is within the scope of the invention to provide a viewing screen with inch marks thereon for comparing the enlarged images in relation to the screen size. The frame 45 also contains directions 60 for using the chart 25 in a reader. As will readily be seen from the chart 25 (FIG. 2), the 17 X ratio frame 27 up through the 42 X ratio frame 61 each contains the four paragraphs of 10, 12, 13.2 and 15 characters per inch, however the 43 X ratio frame 62 along with the adjacent 44 X and 45 X ratio frames 63, 64 have three such paragraphs of 10, 12, and 13.2 characters, while the 46 X ratio frame 31 and up including the 50 X ratio frame 26 have only two paragraphs of 10 and 12 characters per inch. This arrangement is of course shown for the purpose of comparison and need not be a limiting factor in the arrangement of the image frames on the chart 25. Referring back to the horizontal reduction scales 35 and 36 (FIGS. 3 and 4), the units 65 are inch incremented for each magnification and the dimensions of these scales are computed by the following formula:

$$A = I/R$$

wherein $A$ = the actual image dimension on the microform or chart, $I$ = the magnified image dimension, and $R$ = the reduction ratio.

In the manner of operation and method of using the reduction ratio microfiche chart 25 to determine the magnification ratio of a reader of unknown ratio, the chart is inserted into the reader 10, between the glass plates thereof, and the fiche holder or carrier is moved by means of handle 20 to the position for projecting one of the horizontal reduction scales 35 or 36 onto the screen 12 — as shown in FIG. 1 where, for purposes of illustration, frame 36 has been the scale selected. Many times it is known beforehand whether a particular reader has a lens which falls within the 17 X to 33 X ratio range or within the 33 X to 50 X range and it is a simple matter to rapidly select the correct scale 35 or 36 for the reader. Of course, if it is observed from the reader screen that the units do not approach inch measurements, the chart or fiche holder is moved only a small amount to the right or left to project the proper scaled frame.

With the selected scale so projected, a ruler or other like measuring device with one inch spaced marks thereon is placed against the reader screen 12 and moved upwardly or downwardly to that line wherein the ruler inch marks coincide with a particular set of unit marks 65 on the selected reduction scale 35 or 36 on the chart 25. The longer marks on the lines designated as 65 (FIGS. 3 and 4) are one-inch spaced with one-half inch marks therebetween. The magnification ratio of the reader is then read at the left end of the coinciding line on the screen. If, as an example, such ruler inch marks closely coincide with those of the 24 X line 66 (FIG. 3), the 24 X is so read and the chart holder is next moved to that position where the 24 X magnification ratio frame 45 (FIG. 2) shows on the screen 12, in enlarged form (FIG. 5). The units 57 across the top of such frame 45 and the units 58 at the left side of such frame are coincident with the inch marks on a ruler and are used to determine the usable height and width of the reader screen 12.

The optimum displayable area of the reader screen and the optimum selection of spacing of characters are determined by observing the 24 X ratio frame 45 on the screen 12 and by following the directions 60 on such frame. Using the table 70 in conjunction with the screen width, the number of characters displayable for a reader of this magnification and screen width is readily determined, although dependent upon the desired number of characters per horizontal unit. For example, if the usable screen width is twelve (12) inches, it is noted that 120 characters can be displayed with a 10 character per inch spacing, whereas 144 characters can be displayed if the numbers of characters per inch is increased to 12. Another factor to be considered in the selection of the number of characters per inch is whether a computer tape derived initially from a printer is 132 or 160 column width, these being preferred standards. Using the table 72 in conjunction with the screen height (units 58 at the left side of the frame 45), the number of lines that can be displaced vertically on the screen 12 is readily determined. If more lines are desired, it is only necessary to move to a higher reader magnification ratio on the chart 25. If the number of lines displayable is known, the table 72 shows the number of units 58 required to display this known number of lines.

Of course, the width and height of certain screens may be different from others, so it is only necessary that the chart 25 be moved to a higher or lower frame wherein the number of units will adequately fill the screen. The actual number of lines per inch (if other than 6) can of course be determined approximately by measuring the height of the screen with a ruler or the number can be determined accurately by multiplying six times the reduction factor of the frame displayed and dividing by the magnification ratio of the reader as determined above.

Additionally, each frame 45 shows the several fonts 50, 51, and 52 in readily readable manner on the screen and the type of font desired is easily selected from a viewing of the frame.

It is thus seen that herein shown and described is a method and apparatus for simply and rapidly determining the magnification ratio of a microform reader by using a reduction ratio chart having all the needed information thereon, and which accomplishes the objects and advantages as mentioned above. While only one embodiment of the invention has been disclosed herein, it is obvious that certain variations thereon may occur to those skilled in the art without departing from the spirit of such invention and thus contained within the scope of the invention.

We claim:

1. A method of determining the magnification ratio of a microform reader having a projection system and a viewing screen by means of a chart having a plurality of reduced images thereon, comprising the steps of:

inserting the chart into the reader for projecting images onto the screen in enlarged manner, placing a measuring device against the viewing screen of the reader, moving the measuring device across the screen to a position wherein marks on the measuring device coincide with corresponding marks on one portion of an enlarged image, and reading the magnification ratio on the viewing screen along that portion of the enlarged image wherein the marks coincide.

2. A method of determining the magnification ratio of a microform reader by use of a template having a plurality of reduction scales thereon, comprising the steps of:
  inserting the template into the reader for projecting the scales into readable form,
  moving the template into position to read one of the scales thereon,
  placing a ruler against the viewing screen of the reader,
  moving the ruler across the screen to a position wherein marks on the ruler coincide with marks on the readable scale, and
  reading the magnification ratio along the scale of the coinciding marks.

3. A method of determining the magnification ratio of a microform reader, the reader having a projection system and a viewing screen, and making use of a template having a plurality of marked reduction scales thereon, comprising the steps of:
  inserting the template into the reader,
  locating one of the reduction scales by moving the template into position for projecting said one scale onto the screen to be observed,
  placing a ruler against the viewing screen,
  moving the ruler across the screen to a position on said scale where the marks on the ruler coincide with marks on the scale, and
  reading the magnification ratio from said scale corresponding with the position of the ruler thereon.

4. Apparatus for determining the magnification ratio of a microform reader having a projection lens system, a microform carriage movable in a plurality of directions, and a screen for viewing a projected image, said apparatus including
  transparency means having a plurality of reduced images thereon to be projected onto the screen, at least one of the images comprising a series of linear scales of various lengths and marked at spaced intervals therealong, and other images comprising record data in different sizes, the transparency means being movable to a position wherein the marks on one of the projected scales coincides with units applied adjacent the screen for reading a ratio from such one scale corresponding to one of said other images on the transparency means.

5. The apparatus of claim 4 including a unit marked member movable across the screen for matching a corresponding linear scale of one of the projected images.

6. The apparatus of claim 5 wherein the transparency means comprises a microfiche having images of different character spacing thereon for selection of optimum displayable record data.

7. A method of determining an optimum pattern for the viewing screen of a microform reader having a known magnification ratio by means of a template having a plurality of various magnification ratio image frames thereon, comprising the steps of:
  inserting the template into the reader,
  moving the template to display the image frame corresponding to the known magnification ratio,
  observing the screen for maximum utilization of height and width dimensions thereof, and
  selecting one of the patterns having spaced lines and characters for substantially filling the screen area.

8. A method of selecting one of the patterns of various character fonts and spacing on the viewing screen of a microform reader by means of a microform having a plurality of reduced images thereon, comprising the steps of inserting the microform into the reader for projecting images onto the screen in enlarged manner,
  moving the microform to project an image of a desired magnification ratio,
  scaling the projected image to determine usable height and width of the screen, and
  selecting the desired character font and spacing for optimum utilization of the screen.

9. A method of selecting one of the patterns of various character fonts and spacing on the viewing screen of a microform reader by means of a microform having a plurality of reduced images thereon, comprising the steps of
  inserting the microform into the reader for projecting images onto the screen in enlarged manner,
  moving the microform to successively project the images for selecting a preferred magnification ratio,
  scaling the projected image to determine usable height and width of the screen, and
  selecting the desired character font and spacing for optimum utilization of the screen.

* * * * *

UNITED STATES PATENT OFFICE
CERTIFICATE OF CORRECTION

Patent No. 3,695,768              Dated October 3, 1972

Inventor(s) Thomas A. Kyle & Charles T. Croy

It is certified that error appears in the above-identified patent and that said Letters Patent are hereby corrected as shown below:

Column 1, line 60, delete "(i.e." and substitute "range".

Column 1, line 61, delete "reduced" (first occurrence).

Column 1, line 61, before "i.e." insert -- ( --.

Signed and sealed this 6th day of March 1973.

(SEAL)
Attest:

EDWARD M. FLETCHER, JR.　　　　　　　ROBERT GOTTSCHALK
Attesting Officer　　　　　　　　　　Commissioner of Patents